United States Patent
Fujii et al.

[11] Patent Number: 6,119,889
[45] Date of Patent: Sep. 19, 2000

[54] TRANSPARENT INSULATED CONTAINER AND MANUFACTURING METHOD THEREFOR

[75] Inventors: Takafumi Fujii; Masashi Yamada; Kunio Matsuda, all of Tokyo, Japan

[73] Assignee: Nippon Sanso Corporation, Tokyo, Japan

[21] Appl. No.: 09/327,170

[22] Filed: Jun. 7, 1999

[30] Foreign Application Priority Data

| Jun. 9, 1998 | [JP] | Japan | 10-161157 |
| Mar. 8, 1999 | [JP] | Japan | 11-060891 |
| Apr. 6, 1999 | [JP] | Japan | 11-099380 |

[51] Int. Cl.[7] .................................................. B65D 90/00
[52] U.S. Cl. ............................... 220/592.27; 220/592.28; 215/12.2
[58] Field of Search ..................... 220/592.28, 592.27, 220/665, 592.21; 215/12.2

[56] References Cited

U.S. PATENT DOCUMENTS

| 2,453,946 | 11/1948 | Sulfrian | 220/592.27 X |
| 2,643,021 | 6/1953 | Freedman | 220/592.27 |
| 3,225,954 | 12/1965 | Herrick et al. | 220/592.27 |
| 3,863,794 | 2/1975 | Hata | 220/592.27 X |
| 4,399,919 | 8/1983 | Dosnansky | 220/592.27 X |
| 4,560,075 | 12/1985 | Lu | 220/592.27 |

FOREIGN PATENT DOCUMENTS

| 61-169076 | 7/1986 | Japan . |
| 9-193492 | 7/1997 | Japan . |
| 10-155667 | 9/1998 | Japan . |

Primary Examiner—Steven Pollard
Attorney, Agent, or Firm—Nixon & Vanderhye P.C.

[57] ABSTRACT

A transparent insulated container is provided which has a simple structure, which has superior temperature maintaining properties, and is transparent such that the contents housed within the insulated container can be visually checked from the sides.

The transparent insulated container has a double-walled structure in which inner and outer containers formed from a transparent material such as glass or synthetic resin, are arranged so that a space is formed therebetween, and are made into a single body by joining the rims of their respective mouths and. A thermal radiation preventing layer through which visible rays can pass is formed on at least one of outer surface of inner container and inner surface of outer container which are on opposite sides of and face onto the space.

20 Claims, 3 Drawing Sheets

TRANSPARENT INSULATED CONTAINER AND MANUFACTURING METHOD THEREFOR

BACKGROUND OF THE INVENTION

1. Field of the Invention

The present invention relates to insulated containers which comprise an insulated container and an insulated lid which covers the mouth of the insulated container, such as vacuum flasks, cooler boxes, ice boxes, insulated cups, insulated tableware, temperature maintaining lunch boxes, and the like. In particular, the present invention relates to an insulated container formed using a transparent material such as synthetic resin or glass, and having a double-walled structure with an insulating layer lying therein, and a manufacturing method therefore.

The present application is based on Japanese Patent Application No. Hei 10-161157, Japanese Patent Application No. Hei 11-60891, and Japanese Patent Application No. Hei 11-99380 filed in Japan, the contents of which are incorporated herein by reference.

2. Description of the Related Art

In thermally insulated containers such as vacuum flasks, cooler boxes, ice boxes, insulated cups, insulated tableware, and temperature maintaining lunch boxes, conventionally, a metal double-walled container is used which has been made to have an insulating function by arranging a stainless steel inner container and a stainless steel outer container so that a space is formed therebetween, joining the mouths of these inner and outer containers to give a single body, and then vacuum-evacuating the above-mentioned space. In addition, in order to improve the insulating function further, in particular, for the purpose of preventing heat radiation, a layer of metallic plating such as copper or silver has been formed, or copper or aluminum foil has been arranged on the surface of the wall of the inner container or the outer container which face the above mentioned space. However, with these types of insulated containers, since the inner and outer containers are made from metal such as stainless steel, it is not possible to see the inside of the container from the side. In order to check the condition of the contents housed in the container, it is necessary to look through the opening. For this reason, due to the opening of the opening every time the contents of the container are checked, heat is lost or gained through the opening, and therefore there is the problem that despite having a temperature maintaining function as an intrinsically thermally insulated container, the intrinsic temperature maintaining property cannot maintained.

Because of this situation, for situations such as checking the amount of liquid held within the container, for example, liquid level gauges have been provided which are formed from a glass tube which is attached with one end connected to the bottom of the container and the other end connected to the upper end of the inside of the container. However, with this type of structure, since it is an insulated container, it is also necessary for this attached glass liquid gauge to be insulated. When the gauge is set inside of the insulation layer, additionally, it is necessary for processing to provide an air tight window in the stainless steel outer container in order to be able to see the gauge. For this reason, in this situation, not only are the number of necessary parts increased, but manufacture is made complex and manufacturing costs are increased.

In addition, there are double-walled containers of synthetic resin or glass which are formed by arranging inner and outer containers, made using synthetic resin or glass, leaving a space therebetween, and then joining them at their respective mouths to form a single body. In addition, various types of insulation layers can be formed. For the above mentioned synthetic resin containers, insulation layers are made by positioning solid insulation materials, forming an air layer within the space, or the like. For the above mentioned glass containers, an insulation layer is formed by vacuum evacuation of said space. With insulated containers having this type of structure, in order to prevent thermal radiation, metal foil is positioned on, or metal plating is applied to the surface of the walls facing the above mentioned space. As a result of this, despite the fact that the inner and outer containers are transparent, visibility of the inside of the container is blocked, and it is not possible to see the inside of the container. On the other hand, if the container is made in such a way that the inside can be seen, it is necessary to omit the arrangement of metal foil or plating for the above mentioned prevention of thermal radiation, and this is a problem because it runs counter to the goal of improving insulating efficiency.

SUMMARY OF THE INVENTION

Learning from the above-mentioned conventional problems and inconveniences, the problem to be solved by the present invention is the provision of an insulated container for which the number of parts can be reduced, for which production costs can be reduced due to a simple structure, with which it is possible to visually check the content of the container from any direction, and which is capable of maintaining a high insulating capacity.

In order to achieve the goal of solving the above-mentioned problems and inconveniences, the insulated container of the present invention comprises a double walled structure formed by arranging an inner container formed from a transparent material such as glass or synthetic resin within an outer container formed from a transparent material such as glass or synthetic resin, leaving a space therebetween, and then joining the rims of the mouths thereof to give a unified body, wherein a thermal radiation preventing layer through which visible rays can pass is formed on at least one surface of the surface of the above mentioned inner container and the surface of the above mentioned outer container which are on opposite sides of and face onto the above mentioned space.

Here, in the above mentioned insulated container of the present invention, the thermal radiation preventing layer through which visible rays can pass and which is formed on at least one surface of the surface of the above mentioned inner container and the surface of the above mentioned outer container which are on opposite sides of and face onto the above mentioned space may be arranged by wrapping a thermal radiation preventing film, obtained by forming a thermal radiation preventing membrane through which visible rays can pass on a transparent film, onto at least one surface of the surface of the inner container and the surface of said outer container which are on opposite sides of and which face onto the above mentioned space formed therebetween.

In addition, the above mentioned thermal radiation preventing film comprises a thermal radiation preventing membrane formed on one side, and a mark for distinguishing the front from the back and for determining positioning may be provided on the above mentioned thermal radiation preventing film at a position corresponding to a specific position on the container wall, so that when the above mentioned thermal radiation preventing film is wrapped around the container, the radiation preventing membrane is always positioned on the side facing toward the space.

In addition, a mark, for indicating the position at which the wrapping will begin, which comprises a small groove or ridges in the axial direction of the wall may be formed in the surface of the above mentioned surface of the container to which the thermal radiation preventing film will be attached.

Furthermore, the above mentioned thermal radiation preventing layer of the transparent insulated container of the present invention may be a layer which reflects infra-red rays.

In addition, a gas having low thermal conductivity may be enclosed in the space of the transparent insulated container of the present invention.

In addition, the transparent insulated container of the present invention in which a gas having low thermal conductivity has been enclosed in the above mentioned space may comprise an aperture, which communicates with the space, in at least one of the inner container and the outer container, and the above mentioned aperture is sealed.

In addition, in the transparent insulated container of the present invention, when the material which forms the inner and outer container is synthetic resin, the synthetic resin may be a synthetic resin having a high gas barrier property.

In addition, the thermal radiation preventing layer may be formed as a laminate of the thermal radiation preventing membrane.

Next, the manufacturing method for a transparent insulated container of the present invention comprises arranging a thermal radiation preventing layer through which visible rays can pass on at least one surface of an outer surface of an inner container having a bottom and comprising a transparent material such as synthetic resin or glass and an inner surface of an outer container having a bottom slightly larger than the above mentioned inner container and comprising a transparent material in the same way; then putting the above mentioned inner container within the above mentioned outer container; arranging the above mentioned inner container and the above mentioned outer container leaving a space therebetween; joining the above mentioned inner container and the above mentioned outer container into a single body by welding the respective rims of the mouths thereof and, thereby, forming a container having a double walled structure of the above mentioned inner container and the above mentioned outer container.

In addition, the above mentioned thermal radiation preventing layer through which visible rays can pass and which is provided on at least one surface of the above mentioned outer surface of the above mentioned inner container and the above mentioned inner surface of the above mentioned outer container may be formed by using a thermal radiation preventing membrane formed on a transparent film as a thermal radiation preventing film, and then wrapping the above mentioned thermal radiation preventing film around the above mentioned surface.

In addition, the above mentioned thermal radiation preventing film is formed by providing a thermal radiation preventing membrane on one surface of a transparent film; providing a mark for distinguishing the front from the back and for determining positioning such that when the thermal radiation preventing film is wrapped around a container wall, the thermal radiation preventing membrane is always positioned facing toward the space; and aligning the above mentioned mark for distinguishing the front from the back and for determining positioning with a mark for determining positioning provided on the surface of the container; and wrapping the thermal radiation preventing film around the surface of the container.

In addition, the transparent insulated container of the present invention may be constructed by arranging a thermal radiation preventing layer through which visible rays can pass on at least one surface of an outer surface of an inner container having a bottom and formed from a transparent material such as synthetic resin or glass and an inner surface of an outer container having a bottom slightly larger than the above mentioned inner container and provided with an aperture and formed from a transparent material such as synthetic resin or glass; then putting the above mentioned inner container within the above mentioned outer container; arranging the above mentioned inner container and the above mentioned outer container leaving a space therebetween; joining the above mentioned inner container and the above mentioned outer container into a single body by welding the respective rims of the mouths thereof to form a container having a double walled structure of the above mentioned inner container and the above mentioned outer container; then filling the above mentioned space with a gas having low thermal conductivity via the above mentioned aperture; and sealing the above mentioned aperture by attaching a sealing plate using an adhesive.

The present invention is carried out by embodiments such as those explained above and it provides effects like those described below.

In the transparent insulated container of the present invention, the inner and outer containers are formed from a transparent material such as synthetic resin or glass, a double-walled structure is formed by these inner and outer containers, and an insulation layer is formed in which a thermal radiation preventing layer through which visible rays can pass is disposed in the space formed between the above mentioned inner and outer containers, therefore, the inside of the insulated container can always be checked. Therefore, it is possible to check the condition of the contents, such as food or drink, which are stored in the container, without opening the mouth through which products are put in or taken out, and it not necessary to open the mouth of the container except when it is necessary to put something in or take something out. As a result, the opportunities for penetration of external air into the container and for heat to be lost to the outside from inside the container are reduced, and it is possible to continuously maintain the temperature maintaining property which the insulated container intrinsically has.

In addition, it is possible to make the manufacturing process for the above mentioned thermal radiation preventing layer simple by means of wrapping a thermal radiation preventing film, in which a thermal radiation preventing membrane is formed on a transparent film, onto at least one surface of the outer surface of the above mentioned inner container and the inner surface of the above mentioned outer container, and it is possible to form the thermal radiation preventing layer with a high yield.

In addition, the thermal radiation preventing membrane is formed on only one surface of the transparent film, a mark for distinguishing the front from the back and for determining positioning is provided on this, and when it is wrapped around the surface of the container, the mark for distinguishing the front from the back and for determining positioning is positioned and aligned with a specific position on the surface to be covered in such as way that the surface of the membrane formed on the film is positioned on the outside facing onto the space and does not make contact with the surface of the container. Therefore, it is possible to appropriately and accurately determine the position for the thermal radiation preventing film, it is possible to improve workability and to increase production efficiency, and to realize a reduction in manufacturing costs.

In addition, it is possible to improve the insulation properties of the insulated container and the insulated lid of the present invention by forming a double-walled structure by means of the inner and outer containers and the inner lid and outer lid containers for the purpose of forming the space as the insulation layer. In addition, the space is evacuated to a vacuum, a gas of low thermal conductivity is introduced, and thereby it is possible to improve the insulation properties even further. In addition, for this reason, the aperture which communicates with the space is sealed by a sealing plate using an adhesive, therefore, it is possible for the seal to be rapidly and securely formed. In addition, the resulting air-tightness of the seal is maintained, the gas having low thermal conductivity which has been introduced into the space through the aperture does not escape to the outside, or a vacuum can be maintained for a long period of time, and, therefore, it is possible to obtain an excellent transparent insulated container which maintains its insulating properties.

In addition to this, in the above-mentioned way, the respective structural features such as the thermal radiation preventing layer, the enclosing of the low thermal conductivity gas in the space and the sealing thereof, and the like can all be formed independently, and they are extremely simple, therefore, manufacture is easy, manufacturing costs can be reduced, and a structural construction is formed which is suitable for commercial mass production of a high performance transparent insulated container.

DETAILED DESCRIPTION OF THE PREFERRED EMBODIMENTS

Figure 1:
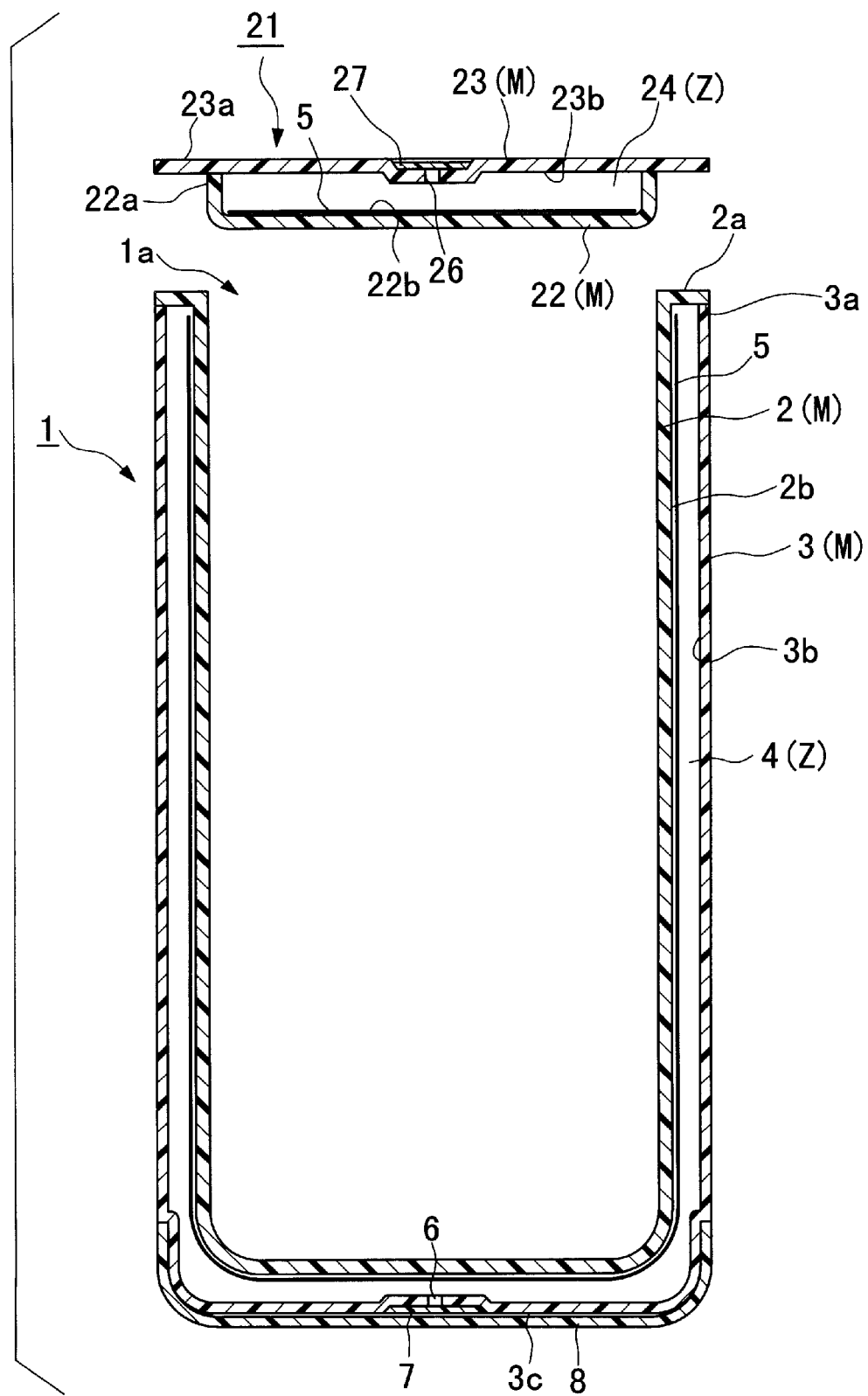
FIG. 1 is a cross-section of a vacuum flask and insulated lid showing an example of the transparent insulated container of the present invention.

An embodiment of the present invention will be explained with reference to FIG. 1. FIG. 1 shows a cross-section drawing of a wide-mouthed vacuum flask and an insulated lid which can be fitted over the mouth thereof, as an example of an insulated container of the present invention. Reference 1 is a wide-mouthed vacuum flask which is an example of an insulated container of the structure of the present invention. The mouth 1a of this vacuum flask 1 is covered by an insulated lid 21 which can be removably attached and which seals the mouth 1a.

The vacuum flask 1 comprises a double-walled structure which is formed by arranging the outer container 3 which is in contact with the atmosphere so that it envelopes the inner container 2 which is in contact with the food or drink stored therein when food or drink is stored in the vacuum flask 1. The rims of the mouths 2a and 3a of the inner container and the outer container respectively are joined to give a unified body. In addition, a gas having low thermal conductivity Z which has a thermal conductivity the same as air or lower than air and which comprises at least one gas from krypton, xenon, argon, or the like is enclosed in the space 4 which is formed between the inner container 2 and the outer container 3.

In addition, as the material from which the above mentioned inner and outer containers 2 and 3 are formed, a transparent material M such as glass or synthetic resin is used. From among these transparent materials M, when synthetic resin is used, a synthetic resin having high gas barrier properties is preferable. In addition, more specifically, the following synthetic resins which have a gas permeability (based on ASTM D 1438-58) of 1.0 g/m$^2$/24 hr/atm or less (with respect to $O_2$, $N_2$, and $CO_2$) are preferable; for example, synthetic resins such as methyl methacrylate resin, polyethylene naphthalate resin, and polyacrylonitrile are suitable, and appropriately selecting and using one of these is preferable.

In addition, the insulating property of the vacuum flask of the present invention is improved by forming a thermal radiation preventing layer 5 on the surface of at least one of the outer surface 2b of the inner container 2 or the inner surface 3b of the outer container 3 which are on opposite sides of and face onto the space 4 which is formed between the inner container 2 and the outer container 3. In FIG. 1, this is arranged on the outer surface 2b of the inner container 2. However, this may also be the inner surface 3b of outer container 3. In addition, the insulating effectiveness can be further improved by forming the thermal radiation preventing layer 5 on both the mutually opposing outer surface 2b of the inner container 2 and inner surface 3b of the outer container 3. In addition, the material used as this thermal radiation preventing layer 5 is a special feature of the present invention. This material is a material through which visible rays passes, and which absorbs or reflects infra-red rays. This material is suitably obtained using metal powders (Ag, Au, etc.), metal oxides, or metal nitrides, which may be deposited using vacuum deposition, sputtering or ion plating, and it may be single layered or multi-layered. In addition, deposition is also possible by means of coating, and the like, using organic coloring materials such as cyanine and the like, or organic metal complex salts.

By means of forming a laminate, it is possible for infrared rays to be absorbed or reflected much more efficiently.

In addition, substances which use anthraquinone derivatives; substances obtained by dispersing ultra-fine powders of copper halides (copper (I)), or heat kneading copper (II) sulfide or copper (II) sulfide and thiourea derivatives and/or derivatives; substances which use a copper (II) sulfide and a photo reflecting frame can be used. Specifically, antimony-doped tin oxide (ATO), tin-doped indium oxide (ITO), and the like have infra-red reflection rates which are highly suitable. This can be formed by a deposition means such as vacuum deposition, sputtering, ion plating or the like.

It is not always necessary to form the above mentioned thermal radiation preventing layer 5 by directly forming the thermal radiation preventing membrane onto the specified opposing surfaces 2b or 3b of the inner and outer containers 2 and 3. As shown in FIGS. 2 to 5, when the thermal radiation preventing film 31 is prepared in advance by film formation by means of the vacuum deposition, sputtering or ion plating of a material which allows visible rays to pass through and which absorbs or reflects infra-red rays, such as the above mentioned antimony-doped tin oxide, onto a transparent film 32, and this is then disposed by wrapping it around the surface 2b or the surface 3b which are on opposite sides of and face onto the space 4 formed between the inner and outer containers 2 and 3, it is possible for the thermal radiation preventing layer 5 to be reliably provided and positioned with good working efficiency.

Moreover, since the materials for the thermal radiation preventing membrane which are deposited by means of vacuum deposition, sputtering or ion plating are expensive, it is not necessary for the thermal radiation preventing membrane to be deposited on both surfaces of the transparent film, it is sufficient for it to be formed on one side only. Then, by positioning the thermal radiation preventing membrane surface so that it faces toward the space 4, the thermal radiation prevention effect is the same as the effect achieved when the membrane is formed on both surfaces, and this has the advantage of low cost.

Since the thermal radiation preventing layer 5 of the present invention which is formed from the above-mentioned material is provided in the space in which the insulation layer is formed by enclosing a gas having low thermal conductivity Z such as krypton, xenon, argon, or the like, there are no factors which will cause deterioration of this thermal radiation preventing layer 5 since it is always exposed to an inert gas, such as krypton, xenon, argon and the like, which is a gas having low thermal conductivity Z. For this reason, it is not necessary to provide another substance as a protective coating layer over the thermal radiation preventing layer 5. Therefore, it is possible to obtain sufficient utilization of the infrared reflecting characteristic which the thermal radiation preventing layer 5 intrinsically possesses.

In addition, reference 6 indicates an aperture which is provided in the bottom 3c of the outer container 3 for the purpose of vacuum evacuating the space 4 and for introducing a gas having low thermal conductivity Z into the space 4. Reference 7 indicates a sealing plate for blocking and sealing the above mentioned aperture 6, and it is preferable from the point of view of manufacturing that it be made using a material which is similar to that of outer container 3. Then, when this is bonded over the aperture 6 using an adhesive and the aperture is blocked, it is possible to reliably seal and block the aperture in an extremely firm and air tight manner. In addition, reference 8 is a protection cover for protecting the bottom the vacuum flask 1.

In the above, the structure of the vacuum flask 1 of the present invention was explained, but it is also possible for the insulating lid 21 which covers the mouth 1a of the vacuum flask 1 to be formed having the same structure. Moreover, for simplicity, structures of insulating lid 21 which are identical to structures of the above mentioned vacuum flask 1 are indicated by references obtained by adding 20 to the references used to indicate those structures in the drawing of vacuum flask 1.

The insulating lid 21 is a double-walled lid formed by arranging an inner lid container 22, which faces onto the contents of the container, and an outer lid container 23, which is exposed to the atmosphere, leaving a space 24 therebetween, and then the inner lid container 22 and the outer lid container 23 are formed into a single body by bonding the rims of their respective mouths 22a and 23a. The inner lid container 22 and the outer lid container 23 are made from a transparent material such as glass or synthetic resin. In addition, an insulation layer is formed by enclosing a gas having low thermal conductivity Z comprising at least one gas from krypton, xenon, and argon in the above mentioned space 24.

In addition, the insulating property is improved by forming a thermal radiation preventing layer 5 on the surface of at least one of the surfaces 22b or 23b which are on opposite sides of and face onto the space 24 which is formed between the inner lid container 22 and the outer lid container 23. In FIG. 1, this is arranged on the surface 22b of the inner lid container 22. However, this may also be the surface 23b of outer lid container 23. In addition, the insulating effectiveness can be further improved by forming the thermal radiation preventing layer 5 on both the mutually opposing surface 22b of the inner lid container 22 and surface 23b of the outer lid container 23. In addition, the material used as this thermal radiation preventing layer 5 is a special feature of the present invention. This material is a material through which visible rays can pass, and which absorbs or reflects infra-red rays, and, preferably, uses metal oxides, or metal compounds. More specifically, antimony-doped tin oxide, tin-doped indium oxide, and the like are suitable. In the same way as for the above mentioned vacuum flask 1, these can be formed by a deposition means such as vacuum deposition, sputtering, ion plating or the like.

It is not always necessary to form the above mentioned thermal radiation preventing layer 5 by directly forming the thermal radiation preventing membrane onto the specific opposing surfaces 22b or 23b of the inner lid container 22 and outer lid container 23. As shown in FIGS. 2 to 5, when the thermal radiation preventing film 31 is prepared in advance by film formation by means of the vacuum deposition, sputtering or ion plating of a material which allows visible rays to pass through and which absorbs or reflects infra-red rays, such as the above mentioned antimony-doped tin oxide, onto a transparent film 32, and this is then disposed by wrapping it around the surface 22b or the surface 23b which are on opposite sides of and face onto the space 24 formed between the inner lid container 22 and outer lid container 23, it is possible for the thermal radiation preventing layer 5 to be reliably provided and positioned with good working efficiency.

Moreover, since the materials for the thermal radiation preventing membrane which are deposited by means of vacuum deposition, sputtering or ion plating are expensive, it is not necessary for the thermal radiation preventing membrane to be deposited on both surfaces of the transparent film, it is sufficient for it to be formed on one side only. Then, by positioning the thermal radiation preventing membrane surface so that it faces toward the space 24, the thermal radiation prevention effect is the same as the effect achieved when the membrane is formed on both surfaces, and this has the advantage of low cost.

In addition, as the material from which the above mentioned inner lid container 22 and outer lid container 23 are formed, a transparent material M such as glass or synthetic resin is used. From among these transparent materials M, when synthetic resin is used, a synthetic resin having high gas barrier properties is preferable, in the same way as for the above mentioned vacuum flask 1. More specifically, the following synthetic resins which have a gas permeability (based on ASTM D 1438-58) of 1.0 g/m$^2$/24 hr/atm or less (with respect to $O_2$, $N_2$, and $CO_2$) are preferable; for example, synthetic resins such as methyl methacrylate resin, polyethylene naphthalate resin, and polyacrylonitrile are suitable, and appropriately selecting and using one of these is preferable.

In addition, reference 26 indicates an aperture which is provided in the outer lid container 23 for the purpose of vacuum evacuating the space 24 and for introducing a gas having low thermal conductivity Z into the space 24. Reference 27 indicates a sealing plate for blocking and sealing the above mentioned aperture 26, and it is preferable from the point of view of manufacturing that it be made using a material which is similar to that of outer lid container 23. Then, when this is bonded over the aperture 26 using an adhesive and the aperture is blocked, it is possible to reliably seal and block the aperture in an extremely firm and air tight manner.

The above mentioned thermal radiation preventing layer 5 of the present invention may be formed by directly depositing the above mentioned material, which allows visible rays to pass through but which absorbs or reflects infra-red rays, onto the outer surface 2b of the inner container 2 and the inner surface 3b of the outer container 3, and the surface 22b of inner lid container 22 and surface 23b of outer lid container 23, which are on opposite sides of and face onto the space 24. However, by means of producing a thermal radiation preventing film separately in advance by forming a membrane of the material through which visible rays can pass and which absorbs or reflects infra-red rays onto a transparent film, and then suitably arranging this on each of the surfaces of the above mentioned inner and outer containers, working efficiency is improved because the formation operations for the thermal radiation preventing layer 5 are extremely easy, and accurate positioning is possible.

Next, the manufacturing method for the insulated container of the present invention will be explained using the above mentioned vacuum flask 1 shown in FIG. 1 as an example.

Firstly, an inner container 2 being a cylindrical body with a bottom and having a desired shape and an outer container 3 being a cylindrical body with a bottom, having an aperture in the bottom thereof, and having a shape slightly larger than the above mentioned inner container 2 are molded from a transparent material M such as, for example, methyl methacrylate resin. Then, a thermal radiation preventing layer 5 which absorbs or reflects infra-red rays and allows visible rays to pass through is formed on the outer surface of the inner container 2 (when the inner container 2 has been joined with the outer container 3, this is the outer surface 2b which faces toward the outer container 3 and which faces space 4).

It is possible for this thermal radiation preventing layer 5 to be formed and deposited directly by means of vacuum deposition, sputtering, ion plating, or the like of the membrane material onto the surface 2b which is opposite the outer container 3 and which faces onto the space 4 as mentioned above. But it is not always necessary for the membrane to be directly deposited onto the surface 2b. For example, as shown in FIGS. 2 to 5, a thermal radiation preventing film 31 can be formed by means of vacuum deposition, sputtering, ion plating, or the like of the above mentioned material 33 which allows visible rays to pass through and which absorbs or reflects infra-red rays, such as antimony-doped tin oxide, onto a transparent film 32. This can then be wrapped around the surface 2b of the inner container 2 or the surface 3b of the outer container 3 which are on opposite sides of and face onto the space 4, and thereby workability may be improved.

In this situation, the thermal radiation preventing film 31 can be divided into a piece for use on the cylindrical part and a piece for use on the bottom part and then positioned. By means of dividing and then positioning in this way, it is possible to appropriately position and attach the thermal radiation preventing film 31 matching the shape of the inner container 2 without the production of wrinkles, and it is possible to make a shape with which the contents can be extremely well seen.

As the layer material, which allows visible rays to pass and which absorbs or reflects infra-red rays, of the thermal radiation preventing layer 5, for example, antimony-doped tin oxide, tin-doped indium oxide, and the like are suitable.

The thermal radiation preventing layer 5 may be formed as a laminate in order to suitably absorb or reflect infra-red rays, by appropriately selecting the above-mentioned membrane materials.

In addition, as shown in FIGS. 2 to 5, when a thermal radiation preventing film 31 is formed by means of forming a membrane 33 of the layer material such as this antimony-doped tin oxide or tin-doped indium oxide on a transparent film 32 in advance, and this thermal radiation preventing film 31 is wrapped around the specified surface 2b of the inner container or the surface 3b of the outer container 3, thereby forming thermal radiation preventing layer 5, the surface of the film on which the membrane has been formed is not against the surface of the container around which the film has been wrapped, it is effective for the film to be provided in such a way that it faces the space 4 side. As one example of this type of thermal radiation preventing film, heat mirror film (product name) manufactured by Mitsui Chemical Co. Ltd. is suitable for use. The percentage of visible rays which passes through this film is about 45 to 80%, and the percentage of infra-red rays, which is related to heat, is a value of about 75 to 90%.

Next, the inner container 2 is inserted into the outer container 3 and arranged leaving a space 4 between the inner container 2 and the outer container 3, and a single body is formed by means of welding the rims of their mouths 2a and 3a using a vibration welder or the like, and thereby a container having a double walled structure is formed.

Next, the space 4 is vacuum evacuated via aperture 6 using an evacuation means (not shown in the Figures) such as a vacuum evacuation pump. Then, a gas having low thermal conductivity Z comprising at least one gas such as krypton, xenon, or argon is introduced into the space 4. Then, when it has been filled to a pressure equal to or slightly higher than atmospheric pressure, the aperture 6 is air-tightly sealed by bonding the sealing plate 7 over the above mentioned aperture 6.

Then, when this sealing plate 7 is bonded over the aperture 6 using an adhesive, and the aperture 6 is sealed, it is possible to make a firm and reliable seal which is very airtight.

In this way, a transparent insulated container like the vacuum flask 1 of the present invention can be manufactured, in addition, an explanation has been omitted, but the insulated lid 21 can be manufactured in the same way.

In addition, in the above-mentioned embodiment, the explanation was made using a vacuum flask as an example, however, the insulated container of the present invention is not limited to vacuum flasks alone. In addition to vacuum flasks, the present invention may be suitably adapted to any insulated container in which the insulation layer is formed by means of a double-walled structure in which a space is formed between an inner container and an outer container, such as cooler boxes, ice boxes, insulated cups, insulated kitchenware, and temperature maintaining lunch boxes. In addition, it can also be suitably adapted to insulated utensils such as insulated lids in which the insulation layer is formed by means of a double-walled structure.

In addition, in the above-mentioned embodiment, an example is given in which a gas having low thermal conductivity Z is introduced into the spaces 4 and 24, however, it is of course possible to apply the present invention to an insulated container having a structure in which the spaces 4 and 24 are filled with air, as long as there is a double-walled structure having insulating properties. In addition, the above mentioned space may also be filled with a silica-type solid insulating material which is clear.

Next, in the embodiment of the insulated container shown in the above-mentioned FIG. 1, with regard to the formation of the thermal radiation preventing layer 5, a method which is simpler and which has good efficiency will be explained using an example of an embodiment thereof shown in FIGS. 2 to 5. Structural parts shown in FIGS. 2 to 5 which are the same as parts shown in FIG. 1 are indicated with the same reference and a detailed description thereof is omitted.

Figure 2:
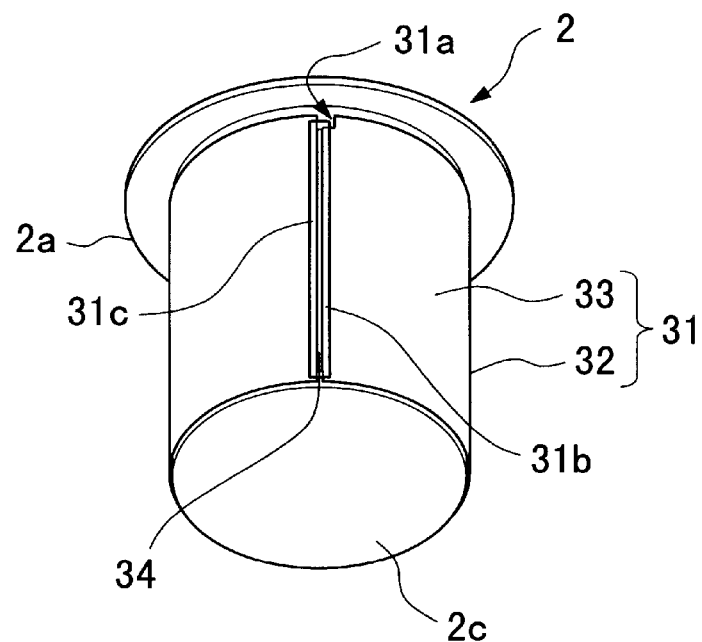
FIG. 2 is an outline drawing of the inner container on which a thermal radiation prevention layer has been formed.

FIG. 2 is an outline drawing of an inner container 2 on which a thermal radiation preventing layer 5 is formed. In this embodiment, a thermal radiation preventing layer 5 is formed by means of wrapping and fixing a thermal radiation preventing film 31 which has been manufactured separately onto the outer surface 2b of the inner container 2.

Figure 3:
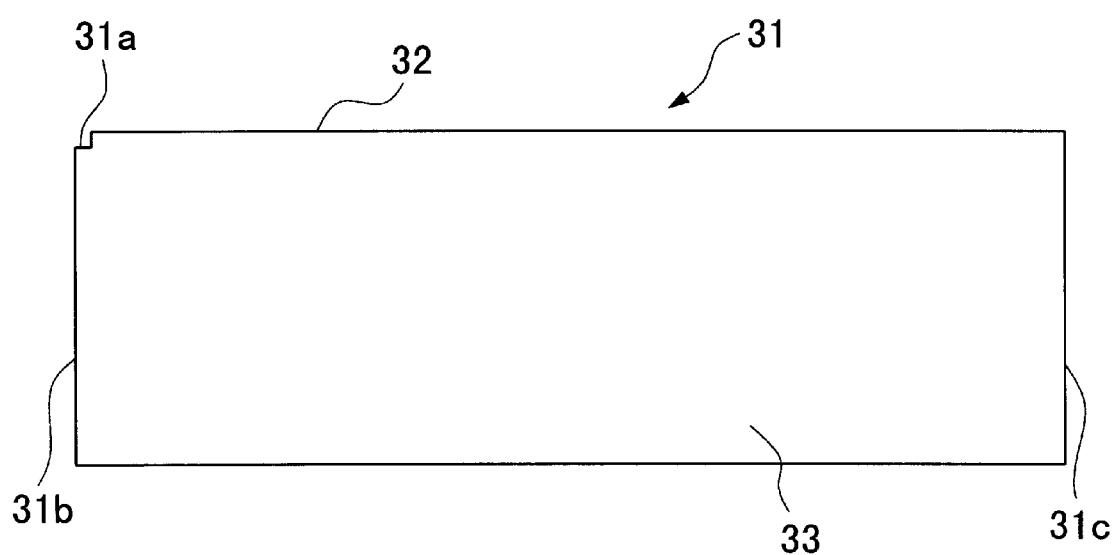
FIG. 3 is a drawing for explaining the structure of the thermal radiation preventing film.

Moreover, it is not necessary for the film and the outer surface 2b to be close and it is preferable for there to be some gaps. In addition, as shown in FIG. 3, this thermal radiation preventing film 31 is formed by depositing material which reflects or absorbs infra-red rays as a thermal radiation preventing membrane 33 by means of vacuum deposition, sputtering, ion plating or the like onto a transparent film 32 of synthetic resin which has an approximately rectangular shape in which the axial dimension and the circumferential dimension of the inner container are respectively taken as the length and width. As the material, for example, antimony-doped tin oxide (AOT), tin-doped indium oxide (ITO), and the like can be suitably used.

In addition, when the thermal radiation preventing film 31 is being arranged on the outer surface 2b of the inner container 2, the surface of the thermal radiation preventing membrane 33 is not in contact with the container surface 2b, it is arranged and positioned on the outer surface of the transparent film so that it always faces the space. Therefore, a mark 31a, such an L-shaped notch, for distinguishing the front from the back and for determining positioning is cut in a suitable place, and preferably in a corner, of the thermal radiation preventing film. Then the thermal radiation preventing film 31 is wrapped and fixed around the surface 2b of the inner container by positioning this mark 31a for distinguishing the front from the back and for determining positioning at a specified position (for example, at the mouth 2a) and such that the surface of the membrane 33 is to the outside. In other words, if this thermal radiation preventing film 31 is positioned so that the surface of the thermal radiation preventing membrane 33 is reversed, the mark 31a for distinguishing the front from the back and for determining positioning will be positioned in a different position, and the membrane 33 will be in a non-reflective symmetry.

In addition, it is preferable that there not be close contact between the thermal radiation preventing film 31 and the outer surface 2b of the inner container 2 and, from the point of view of the insulation property, a gap of 0.1 to 3.0 mm is preferable.

This type of thermal radiation preventing layer 5 is formed by means of a positioning operation process such as the following. This is explained with reference to FIG. 4 and FIG. 5.

Figure 4:
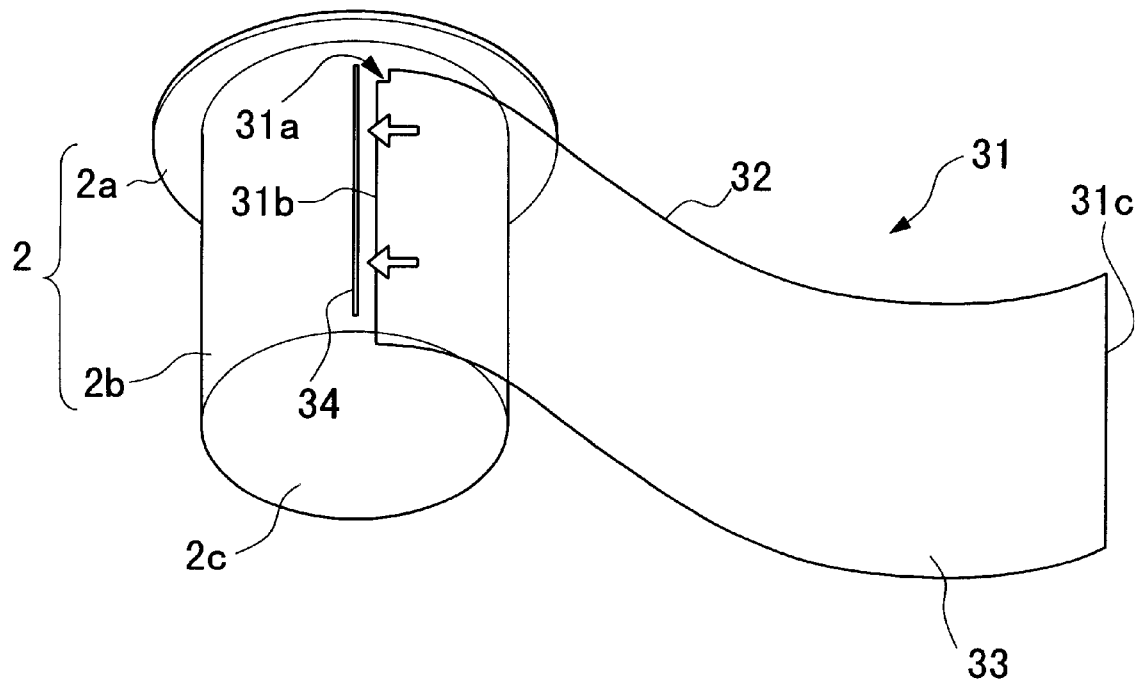
FIG. 4 is a drawing for explaining the initial condition for attaching the thermal radiation preventing film to the inner container.
Figure 5:
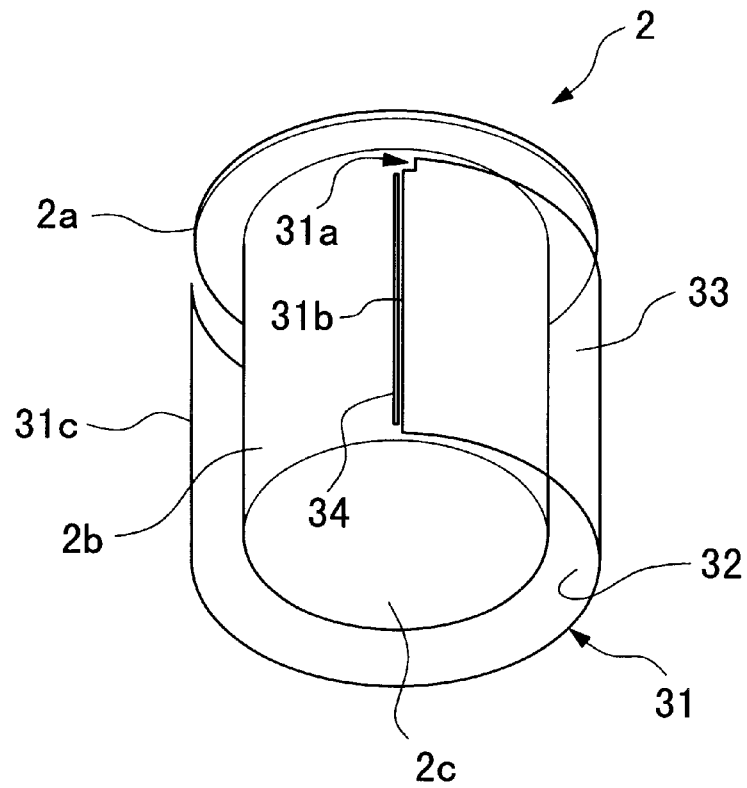
FIG. 5 is a drawing for explaining the final condition for attaching the thermal radiation preventing film to the inner container.

FIG. 4 is an outline diagram for explaining the condition at the initial stage of the positioning. FIG. 5 is an outline diagram for explaining the condition at the final stage of the positioning. As shown in FIG. 4, first, a mark 34, such as a ridge or a groove, for determining the initial position of the film is provided in the surface 2b of the inner container 2 in the up-down axis direction of the inner container 2. One edge 31b of the thermal radiation preventing film 31 is arranged in a position with the above mentioned mark 31a, for distinguishing the front from the back and for determining positioning, at the upper part of the mouth 2a of the inner container, at the mark 34 for determining the initial position of the film. At this time and in this position, the mark 31a, for distinguishing the front from the back and for determining positioning, is provided so that the thermal radiation preventing membrane 33 of the thermal radiation preventing film 31 is on the outer surface of the transparent film 32 which forms the base and so that it is not in contact with the outer surface 2b of the inner container 2. For this reason, if the position is determined in the above-mentioned manner, the thermal radiation preventing membrane 33 surface is arranged such that it is always exposed on the outer surface of the transparent film 32, on the outer surface 2b of the inner container 2. In addition, if by any chance, by mistake, the thermal radiation preventing membrane 33 surface of the thermal radiation preventing film 31 is positioned such that it is in contact with the outer surface 2b of the inner container 2, the position of the mark 31a, for distinguishing the front from the back and for determining positioning, will be changed to the bottom 2c of the inner container 2, or the shape of the mark 31a will be reversed or upside down, therefore, it will be possible to immediately determine that there has been a mistake in the positioning.

Consequently, it is possible to position the thermal radiation preventing film 31 on the outer surface 2b of the inner container 2 in a condition such that the prevention membrane 33 surface is exposed to the outside, with out error, in a position which is more effective for the purpose of thermal radiation prevention.

Next, once the thermal radiation preventing film 31 is in the above-described condition, one end 31b thereof is attached and fixed to the outer surface 2b of inner container 2 using a fixing means such as adhesive tape. Then, as shown in FIG. 5, the thermal radiation preventing film 31 is wrapped once around the outer surface 2b of the inner container 2, and the other end 31c of the thermal radiation preventing film 31 is attached and fixed using a fixing means such as an adhesive tape at the position of mark 34 for determining the initial position which is provided in the outer surface 2b of inner container 2. In this way, as shown in FIG. 2, a thermal radiation preventing film 31 which is prepared in a separate process can be effectively positioned on the outer surface 2b of inner container 2, and thereby an inner container 2 having a thermal radiation preventing layer 5 can be made.

In the attachment and fixing of the thermal radiation preventing film 31 to the outer surface 2b of the inner container, double-sided adhesive tape is attached in the axial direction to the outer surface 2b of the inner container 2, one end 31b of the thermal radiation preventing film 31 is stuck to a part of the double-sided tape, then the thermal radiation preventing film 31 is wrapped once around the outer surface 2b, the other end 31c of the thermal radiation preventing film 31 is stuck to the remaining part of the double-sided tape, and thereby the thermal radiation preventing film 31 can be fixed to the inner container 2.

Moreover, when the above mentioned thermal radiation preventing film 31 is arranged by wrapping it around the outer surface 2b of inner container 2, with the exception of both ends of the above mentioned thermal radiation preventing film 31, it is not necessary for the surface of the thermal radiation preventing film 31 to be in contact with the outer surface 2b of the inner container 2, and it is preferable for there to be a gap of approximately 0.1 to 3 mm between the outer surface 2b and the film 31. By means of arranging thermal radiation preventing film 31 with a gap in this way, when a hot liquid is housed within inner container 2, even if the external diameter of the inner container 2 increases due to thermal expansion, the exertion of tension on the thermal radiation preventing film 31 is prevented, and thereby it is possible to avoid the film breaking, and to prevent the film from separating from the inner container 2. In addition, it is also preferable from the point of view of the insulating properties.

Using the same assembly method as explained in the above mentioned FIG. 1, this inner container 2, on which a thermal radiation preventing film 31 has been arranged and which has been formed in the above-described way and as shown in FIG. 2, is put inside the outer container 3, and arranged so that a space 4 is formed between inner container 2 and outer container 3, then the inner container 2 and the outer container 3 are joined into a single body by welding the rims of the mouths 2a and 3a thereof using a vibration welder or the like, and thereby a container having a double walled structure is formed.

Next, the space 4 is vacuum evacuated through the aperture 6 which is provided in outer container 3 by means of an evacuation means such as a vacuum evacuation pump. Then a gas having low thermal conductivity Z comprising at least one gas of krypton, xenon, and argon is introduced into space 4. Then, when the space 4 has been filled to a pressure equal to atmospheric pressure or slightly higher than atmospheric pressure, at normal temperature, the sealing plate 7 is placed over the above mentioned aperture 6 and adhered, thereby the aperture is air-tightly sealed.

In addition, when the sealing plate 7 is adhered using an adhesive, and the aperture 6 is sealed, it is possible to reliably and securely seal the aperture 6 in an extremely air-tight manner.

In addition, in the above-described embodiment, an example in which the thermal radiation preventing layer 5 is formed on the outer surface 2b of inner container 2 is explained, however, it is possible to form the thermal radiation preventing layer 5 on the inner surface 3b of outer container 3 in the same way.

In the above, the manufacture of a transparent insulated container is explained, but it is also possible to manufacture an insulated lid using the same method. In addition, in the above mentioned embodiment the explanation was made giving an example in which a transparent synthetic resin was used as the material for the inner container 2 and the outer container 3, however, the present invention is not limited to this, and in place of the synthetic resin, it is of course possible to use transparent glass for the inner container and the outer container, and, in the same way, obtain a transparent insulated container of the present invention.

Moreover, in the above-mentioned manufacturing method, the formation of the thermal radiation preventing layer 5 is explained using an example in which a transparent film on which a thermal radiation preventing membrane has been deposited is used as a thermal radiation preventing film 31 and this is wrapped around and fixed to the specified surface of the inner container or the outer container. However, the present invention is not limited to this, and the same effects can be obtained by forming the thermal radiation preventing membrane directly onto the specified surface of inner container or the outer container.

Furthermore, in order to obtain an appropriate amount of absorption or reflection of the infra-red rays, the thermal radiation preventing layer 5 can be formed using different preventing membrane materials for the laminate.

A transparent container and lid having a structure like that of the present invention as described above, when in use, is used to house liquid drinks and solid or semi-solid foods, and since the insulation layer is arranged with a thermal radiation preventing layer 5 which blocks infra-red rays and allows visible rays to pass through, it is possible to see through the side surfaces and visually check the inside of the container. Consequently, with the transparent insulated container of the present invention, it is possible to check the amount (for example, the amount of a liquid) of the contents housed in the container, changes in the conditions of the contents (for example, how much ice has melted), and the like from the side without removing the insulated lid which covers the mouth. For this reason, since it is not necessary to open the mouth of the insulated container for the purpose of checking the condition of the contents, the amount of heat lost or gained through the mouth is reduced, and the superior insulating property which the insulated container intrinsically has can be maintained.

In addition, the structure of the insulated container of the present invention is extremely simple having only a container having a double-walled structure in which inner and outer containers of a transparent material are arranged with a space therebetween and joined into a single body, a thermal radiation preventing membrane which absorbs and reflects infra-red rays and allows visible rays to pass through, and, when necessary, the above mentioned space is filled with a gas having low thermal conductivity or is evacuated. Therefore, manufacture is easy, manufacturing costs can be reduced, and this is ideal for mass production.

Furthermore, since the thermal radiation preventing layer 5 is formed by manufacturing a thermal radiation preventing film 31 in which a separate thermal radiation preventing membrane 33 has been deposited on a transparent film and then this is wrapped around the outer surface 2b of inner container 2, work operations are simplified, continuous assembly is possible, and extremely remarkable results with respect to production for the purposes of commercialization are realized.

Next, in order to confirm the properties of the transparent insulated container of the present invention, the following tests were conducted.

(1) With regard to the transparent insulated container, the materials of the inner and outer containers (difference in the amount of visible rays which passes through), the material and the thermal radiation preventing layer which allows visible rays to pass through and which absorbs or reflects infra-red rays, and the like were differed and various transparent insulated containers were manufactured (Embodiments 1 through 3). Then, in order to clarify the properties of the transparent insulated containers of the present invention of Example 1, Example 2, and Example 3, conventional insulated containers were manufactured in which non-transparent thermal radiation preventing layers were provided, or in which a thermal radiation preventing layer was not provided so that the inside could be seen (Comparative Example 1 to Comparative Example 3). The temperature maintaining properties due to this differences were then compared.

The dimensions of each of the manufactured insulated containers of Example 1, Example 2 and Example 3 and the each of the Comparative Examples 1 to 3 were the same and were as follows.

Common Dimensions of the Manufactured Insulated Containers

Inner container 2: inner diameter 90 mm; wall thickness: 2.5 mm; height: 235 mm; capacity: 1000 cc.

Outer container 3: external diameter 110 mm; wall thickness: 2.5 mm.

Space 4: width of space: 5 mm.

EXAMPLE 1

As Example 1, a transparent insulated container formed from a synthetic resin of the present invention was manufactured in the following way.

Material of the inner and outer containers 2 and 3: methyl methacrylate resin (transmissivity with respect to visible rays: approximately 95%)

Thermal radiation preventing layer 5: A film "heat mirror 66" (product name) which had been given a metal sputtering treatment, manufactured by Mitsui Chemicals Co. Ltd., was adhered to the outer surface 2b of inner container 2 which faces the space 4.

Gas Z which was introduced into space 4: The space was filled with krypton gas to approximately atmospheric pressure.

Sealing of aperture 6: A polyethylene naphthalate was used as the sealing plate 7, and this was adhered and the aperture sealed using an adhesive.

EXAMPLE 2

As Example 2, an insulated container was manufactured with the material used in Example 1 to make the inner and outer containers and the material used in Example 1 for the thermal radiation preventing layer being replaced in the following way.

Material of the inner and outer containers 2 and 3: polyethylene naphthalate (transmissivity with respect to visible rays: approximately 80%)

Thermal radiation preventing layer 5: A film "heat mirror 44" (product name) which had been given a metal sputtering treatment, manufactured by Mitsui Chemicals Co. Ltd., was adhered to the outer surface 2b of inner container 2 which faces the space 4.

Gas Z which was introduced into space 4: The space was filled with krypton gas to approximately atmospheric pressure.

Sealing of aperture 6: A polyethylene naphthalate was used as the sealing plate 7, and this was adhered and the aperture sealed using an adhesive.

EXAMPLE 3

As Example 3, an insulated container, as follows, was manufactured using the same material for the inner and outer containers 2 and 3 and the same material for the thermal radiation preventing layer as were used in Example 2, while the krypton gas enclosed in space 4 was replaced using air.

Material of the inner and outer containers 2 and 3: polyethylene naphthalate (transmissivity with respect to visible rays: approximately 80%)

Thermal radiation preventing layer 5: A film "heat mirror 44" (product name) which had been given a metal sputtering treatment, manufactured by Mitsui Chemicals Co. Ltd., was adhered to the outer surface 2b of inner container 2 which faces the space 4.

Gas Z which was introduced into space 4: The space was filled with air to approximately atmospheric pressure.

Moreover, with regard to the films "heat mirror 66" and "heat mirror 44" on which a metal sputtering process had been conducted and which were used as the thermal radiation preventing layer 5 in Example 1, Example 2, and Example 3, the transmissability with regard to visible rays for "heat mirror 66" (about 70%) was greater than that of "heat mirror 44" (approximately 45%); and the transmissability with regard to near infra-red rays for "heat mirror 66" (approximately 20% or less) was greater than that for "heat mirror 44" (about 10% or less).

Sealing of aperture 6: A polyethylene naphthalate was used as the sealing plate 7, and this was adhered and the aperture sealed using an adhesive.

Next, the following insulation containers of Comparative Examples 1 to 3 were manufactured for the purpose of comparison. The dimensions are the same as those of Example 1 to Example 3 as described above.

COMPARATIVE EXAMPLE 1

As Comparative Example 1, an insulated container, as follows, was manufactured using, as the thermal radiation preventing layer 5, aluminum foil which is generally used in various conventional insulated containers.

Material of the inner and outer containers 2 and 3: polyethylene naphthalate (transmissivity with respect to visible rays: approximately 80%)

Thermal radiation preventing layer 5: Aluminum foil was adhered to the outer surface 2b of inner container 2 which faces the space 4.

Gas Z which was introduced into space 4: The space was filled with krypton gas to approximately atmospheric pressure.

Sealing of aperture 6: A polyethylene naphthalate was used as the sealing plate 7, and this was adhered and the aperture sealed using an adhesive.

COMPARATIVE EXAMPLE 2

As Comparative Example 2, the following insulated container which is the same as the insulated container of Comparative Example 1 without the thermal radiation preventing layer 5 was manufactured.

Material of the inner and outer containers 2 and 3: polyethylene naphthalate (transmissivity with respect to visible rays: approximately 80%)

Thermal radiation preventing layer 5: none

Gas Z which was introduced into space 4: The space was filled with krypton gas to approximately atmospheric pressure.

Sealing of aperture 6: A polyethylene naphthalate was used as the sealing plate 7, and this was adhered and the aperture sealed using an adhesive.

COMPARATIVE EXAMPLE 3

As Comparative Example 3, as follows, an insulated container the same as in Comparative Example 2 was manufactured with air being enclosed in the space 4 in place of krypton.

Material of the inner and outer containers 2 and 3: polyethylene naphthalate (transmissivity with respect to visible rays: approximately 80%)

Thermal radiation preventing layer 5: none

Gas Z which was introduced into space 4: The space was filled with air to approximately atmospheric pressure.

Sealing of aperture 6: A polyethylene naphthalate was used as the sealing plate 7, and this was adhered and the aperture sealed using an adhesive.

In Table 1, the temperature maintaining properties of the transparent insulated containers of the present invention of Example 1, Example 2 and Example 3 are shown and compared with the temperature maintaining properties of the insulated containers according to Comparative Examples 1 to 3.

The temperature maintaining properties were measured by putting 1000 cc of hot water of 95° C. into the inner container 2, then closing the mouth with a styrene foam lid of 30 mm in thickness, and then measuring the temperature after the passage of 2 hours. The atmosphere was maintained at a temperature of 20° C. all the time in conditions without wind.

ture maintaining property, it is, as might be expected, preferable to enclose a gas having thermal conductivity such as krypton in the space.

④ In addition, with regard to the insulated containers of Example 1, Example 2 and Example 3 in which the thermal radiation preventing layer of the present invention is provided, the insulated containers of Comparative Example 2 and Comparative Example 3 (in which a thermal radiation preventing layer was not provided in order to make visual inspection possible) displayed an ability to maintain the temperature at 64° C. (Comparative Example 2) and 61° C. (Comparative Example 3) indicating that the temperature maintaining property is extremely degraded. Thereby, it is possible to confirm that the effect of the thermal radiation preventing layer of the present invention is extremely large.

(2) Next, a transparent insulation lid based on the present invention was manufactured (Example 4) and, in order to compare the properties thereof, an insulated lid having a structure in which a thermal radiation preventing layer was not provided, and an insulated lid of conventional foam styrene (Comparative Example 4 and Comparative Example 5) were manufactured, and compared.

TABLE 1

|  | Insulated Containers of the Present Invention | | | Insulated Containers of the Comparative Examples | | |
| --- | --- | --- | --- | --- | --- | --- |
|  | Example 1 | Example 2 | Example 3 | Comparative Example 1 | Comparative Example 2 | Comparative Example 3 |
| Temperature after 2 hours (° C.) | 75 | 76 | 70 | 75 | 64 | 61 |
| Visual Inspection Possible | Yes | yes | yes | no | Yes | yes |

As is clear from Table 1:

① The insulated containers of the present invention of Example 1 and Example 2 are not in the slightest bit inferior with respect to the temperature maintaining properties (75°) of the insulated container of Comparative Example 1 which uses aluminum foil as the thermal radiation preventing layer and which has excellent properties as a conventional insulated container of this type. Example 1 displayed an ability to maintain the temperature at 75° C. and Example 2 displayed an ability to maintain the temperature at 76° C. In addition, in the insulated container of Comparative Example 1, the inside of the container was blocked by the aluminum foil and visual inspection was not possible. In contrast, it was possible to inspect the level of the hot water stored in the insulated containers of Example 1 and Example 2.

② In addition, while the insulated container of Example 3 (in which air is enclosed in the space in place of the gas having low thermal conductivity such as the krypton of the above mentioned Example 1 and Example 2) of the present invention displayed an ability to maintain the temperature at 70° C. which is inferior to that of the Example 1 and Example 2, it is still a temperature maintaining ability which is satisfactory for use, and furthermore the contents of the container are visible.

③ In addition, when Example 1 and Example 2 are compared with Example 3, for improving the tempera-

EXAMPLE 4

An insulated lid according to the present invention as below was manufactured.

Inner lid container 22: external diameter: 203 mm, inner diameter: 197 mm, depth: 5 mm, thickness: 3 mm Methyl methacrylate resin (transmissivity with respect to visible rays: approximately 95%) was used as the material.

Outer lid container 23: diameter: 220 mm, thickness: 3 mm; from a disk-shaped mold Methyl methacrylate resin (transmissivity with respect to visible rays: approximately 95%) was used as the material.

Space 24: thickness: 5 mm

The space was filled with krypton gas as the gas having low thermal conductivity to approximately atmospheric pressure.

Thermal radiation preventing layer 5: A film "heat mirror 66" (product name) which had been given a metal sputtering treatment, manufactured by Mitsui Chemicals Co. Ltd., was adhered to the surface 22b of inner lid container 22 which faces the space 24.

Sealing of aperture 6: A polyethylene naphthalate was used as the sealing plate 7, and this was adhered and the aperture sealed using an adhesive.

COMPARATIVE EXAMPLE 4

As Comparative Example 4, an insulated lid not provided with a thermal radiation preventing layer 5 but otherwise having the same conformation, such as materials, dimensions, and the like, as Example 4 was manufactured.

COMPARATIVE EXAMPLE 5

As Comparative Example 5, a foam styrene lid having a thickness of 20 mm and a diameter of 203 mm and not having a thermal radiation preventing layer 5 was manufactured.

In order to test the temperature maintaining property of the transparent insulated lid of the above mentioned Example 4 which is based on the present invention, a stainless steel insulated vacuum flask having a double-walled structure, a shape as shown in FIG. 1 and the following dimensions was used and the temperature maintaining ability was measured.

Material of the inner and outer containers: stainless steel, thickness of the wall of the inner container: 0.4 mm, thickness of the wall of the outer container: 0.8 mm.

Dimensions of the inner container: mouth diameter: 205 mm; depth: 130 mm; actual capacity: approximately 4000 cc.

Insulation layer wall: space: 6.3 mm, evacuated to a vacuum of 10–3 Torr or less.

3500 cc of hot water at a temperature of 95° C. were put into this insulated container, the mouth was respectively covered with the insulated lid of the above mentioned Example 4, and of the above mentioned Comparative Example 4 and Comparative Example 5, for the purposes of comparison. After 6 hours, the change in temperature of the above mentioned hot water was measured. As the results thereof in Table 2, the temperature maintaining ability after the passage of 6 hours for Example 4 of the present invention are shown and compared with the temperature maintaining ability of the insulated lids of Comparative Example 4 and Comparative Example 5, for the purposes of comparison.

In addition, the atmosphere was always maintained at a temperature of 20° C. in conditions without wind.

TABLE 2

|  | Insulated Lid of the Present Invention Example 4 | Insulated Lids of the Comparative Examples | |
|---|---|---|---|
|  |  | Comparative Example 4 | Comparative Example 5 |
| Temperature after 6 hours (° C.) | 73 | 65 | 72 |
| Visual inspection possible | yes | Yes | No |
| Thickness of insulation layer (mm) | 5 | 5 | 20 |

As is clear from Table 2, the insulated lid of Example 4 in which a thermal radiation preventing layer 5 according to the present invention was provided displayed an ability to maintain the temperature at 73° C., and the insulated lid of Comparative Example 4 in which a thermal radiation preventing layer 5 was not provided displayed an ability to maintain the temperature at 65° C. A very large difference in the temperature maintaining ability was produced and the effectiveness of the provision of the thermal radiation preventing layer 5 was confirmed. In addition, the temperature maintaining ability of the insulation lid of Example 4 of the present invention (which demonstrated an ability to maintain the temperature at 73° C.) is approximately the same as or better than the temperature maintaining ability of the insu-lated lid of Comparative Example 5 (which demonstrated an ability to maintain the temperature at 72° C.) which uses foam styrene which is generally used as a conventional insulating material. The insulated lid of the above mentioned Example 4 of the present invention gives the remarkable effects of making it possible to have a thickness of 5 mm which is much thinner than the 20 mm thickness of the insulated lid of convention foam styrene of Example 5, as well as making visual inspection of the inside possible.

Moreover, in the above-described embodiments, the explanation was given in which the thermal radiation preventing layer 5 was formed on the outer surface 2b of inner container 2, but it is also possible to obtain the same actions and effects by forming the thermal radiation preventing layer 5 on the inner surface 3b of the outer container 3, and even better effects are exhibited if the thermal radiation preventing layer 5 is formed on the surfaces of both walls.

Moreover, in the above-mentioned manufacturing method, the formation of the thermal radiation preventing layer 5 is explained using an example in which a transparent film on which a thermal radiation preventing membrane had been deposited was used as a thermal radiation preventing film and this was wrapped around and fixed to the specified surface of the inner container or the outer container. However, the present invention is not limited to this, and naturally the same effects can be obtained by forming the thermal radiation preventing membrane directly onto the specified surface of the inner container or the outer container.

In each of the above-described embodiments, explanation has been given using a vacuum flask as the insulated container, but the present invention is not limited to this alone. In addition to vacuum flasks, the present invention may be suitably adapted to any insulated container in which the insulation layer is formed by means of a double-walled structure in which a space is formed between an inner container and an outer container, such as cooler boxes, ice boxes, insulated cups, insulated kitchenware, and temperature maintaining lunch boxes. In addition, it can also be suitably adapted to insulated utensils such as insulated lids in which the insulation layer is formed by means of a double-walled structure.

In addition, in each of the above-described embodiments explanation was given using transparent synthetic resin as the material of the inner and outer containers which form the insulated container, but the present invention is not limited to this. Any material as long as it is a transparent material, such as glass, can naturally be adapted, and the same actions and effects can be obtained.

What is claimed is:

1. A transparent insulated container comprising a double-walled structure formed by an inner container, formed from a transparent material such as glass or synthetic resin, arranged within an outer container, formed from a transparent material such as glass or synthetic resin, leaving a space therebetween, said inner container and said outer container being made into a single body by the joining of the rims of their respective mouths, wherein a thermal radiation preventing layer through which visible rays can pass is formed on at least one surface of a surface of said inner container and a surface of said outer container which are on opposite sides of and face onto said space.

2. A transparent insulated container according to claim 1 wherein said thermal radiation preventing layer through which visible rays can pass and which is formed on at least one surface of said surface of said inner container and said surface of said outer container which are on opposite sides of and face onto said space is formed by making a thermal radiation preventing film by forming a thermal radiation preventing membrane through which visible rays can pass on a transparent film and wrapping said thermal radiation preventing film onto at least one surface of said surface of said inner container and said surface of said outer container which are on opposite sides of and which face onto said space.

3. A transparent insulated container according to claim 2 wherein said thermal radiation preventing film comprises a thermal radiation preventing membrane formed on one side, and a mark for distinguishing the front from the back and for determining positioning is provided in said thermal radiation preventing film so that when said thermal radiation preventing film is being wrapped onto the container, the thermal radiation preventing membrane is always positioned on the side facing toward said space.

4. A transparent insulated container according to claim 2 wherein a mark for determining the position for the leading edge for wrapping is provided on said at least one surface of an outer surface of said inner container or an inner surface of said outer container which are on opposite sides of and face onto said space, for the wrapping of a thermal radiation preventing film.

5. A transparent insulated container according to claim 2 wherein said thermal radiation preventing layer is a layer which absorbs or reflects infra-red rays.

6. A transparent insulated container according to claim 2 wherein said thermal radiation preventing layer is formed as a laminate of the thermal radiation preventing membrane.

7. A transparent insulated container according to claim 2 wherein a gas having low thermal conductivity is enclosed within said space.

8. A transparent insulated container according to claim 7 wherein an aperture which communicates with said space is provided in at least one of the inner container and the outer container for the purpose of introducing said gas having low thermal conductivity into said space, and said aperture is sealed.

9. A transparent insulated container according to claim 1 wherein a gas having low thermal conductivity is enclosed within said space.

10. A transparent insulated container according to claim 9 wherein an aperture which communicates with said space is provided in at least one of the inner container and the outer container for the purpose of introducing said gas having low thermal conductivity into said space, and said aperture is sealed.

11. A transparent insulated container according to claim 2, wherein the synthetic resin which forms said inner container and said outer container is a synthetic resin having a high gas barrier property.

12. A transparent insulated container according to claim 1, wherein the synthetic resin which forms said inner container and said outer container is a synthetic resin having a high gas barrier property.

13. A transparent insulated container according to claim 1 wherein said thermal radiation preventing layer is a layer which absorbs or reflects infra-red rays.

14. A transparent insulated container according to claim 1 wherein said thermal radiation preventing layer is formed as a laminate of the thermal radiation preventing membrane.

15. A manufacturing method for a transparent insulated container comprising arranging a thermal radiation preventing layer through which visible rays can pass onto at least one surface of an outer surface of an inner container having a bottom and comprising a transparent material such as synthetic resin or glass and an inner surface of an outer container having a bottom slightly larger than said inner container and comprising a transparent material such as synthetic resin or glass;

then putting said inner container within said outer container;

arranging said inner container and said outer container leaving a space therebetween;

joining said inner container and said outer container into a single body by welding the rims of their respective mouths; and thereby forming a container having a double walled structure of said inner container and said outer container.

16. A manufacturing method for a transparent insulated container according to claim 15 wherein said thermal radiation preventing layer through which visible rays can pass and which is provided on at least one surface of said outer surface of said inner container and said inner surface of said outer container is formed by using a thermal radiation preventing membrane formed on a transparent film as a thermal radiation preventing film, and then wrapping said thermal radiation preventing film around said surface.

17. A manufacturing method for a transparent insulated container according to claim 16 wherein said thermal radiation preventing film is formed by providing a thermal radiation preventing membrane on one surface of a transparent film;

providing a mark for distinguishing the front from the back and for determining positioning such that when the thermal radiation preventing film is wrapped around a surface of the container, the thermal radiation preventing membrane is always positioned facing toward the space;

aligning said mark for distinguishing the front from the back and for determining positioning with a position for determining positioning provided on said surface of the container; and positioning and wrapping said thermal radiation preventing film around said surface of the container.

18. A manufacturing method for a transparent insulated container comprising arranging a thermal radiation preventing layer through which visible rays can pass onto at least one surface of an outer surface of an inner container having a bottom and formed from a transparent material such as synthetic resin or glass and an inner surface of an outer container having a bottom slightly larger than said inner container and provided with an aperture and formed from a transparent material such as synthetic resin or glass;

then putting said inner container within said outer container;

arranging said inner container and said outer container leaving a space therebetween;

joining said inner container and said outer container into a single body by welding the rims of their respective mouths to form a container having a double walled structure of said inner container and said outer container;

filling said space with a gas having low thermal conductivity via said aperture; and sealing said aperture by attaching a sealing plate.

19. A manufacturing method for a transparent insulated container according to claim 18 wherein said thermal radiation preventing layer through which visible rays can pass and which is provided on at least one surface of said outer surface of said inner container and said inner surface of said outer container is formed by using a thermal radiation preventing membrane formed on a transparent film as a thermal radiation preventing film, and by wrapping said thermal radiation preventing film around said surface.

20. A manufacturing method for a transparent insulated container according to claim 19 wherein said thermal radiation preventing film is formed by providing a thermal radiation preventing membrane on one surface of a transparent film;

providing a mark for distinguishing the front from the back and for determining positioning such that when the thermal radiation preventing film is wrapped around a surface of the container, the thermal radiation preventing membrane is always positioned facing toward the space;

aligning said mark for distinguishing the front from the back and for determining positioning with a position for determining positioning provided on the surface of the container; and positioning and wrapping the thermal radiation preventing film around the surface of the container.

* * * * *